Sept. 29, 1942.  J. DICHTER  2,297,459
APPARATUS FOR PRODUCING ARTICLES FROM ARTIFICIAL MATERIALS
Filed Sept. 9, 1940
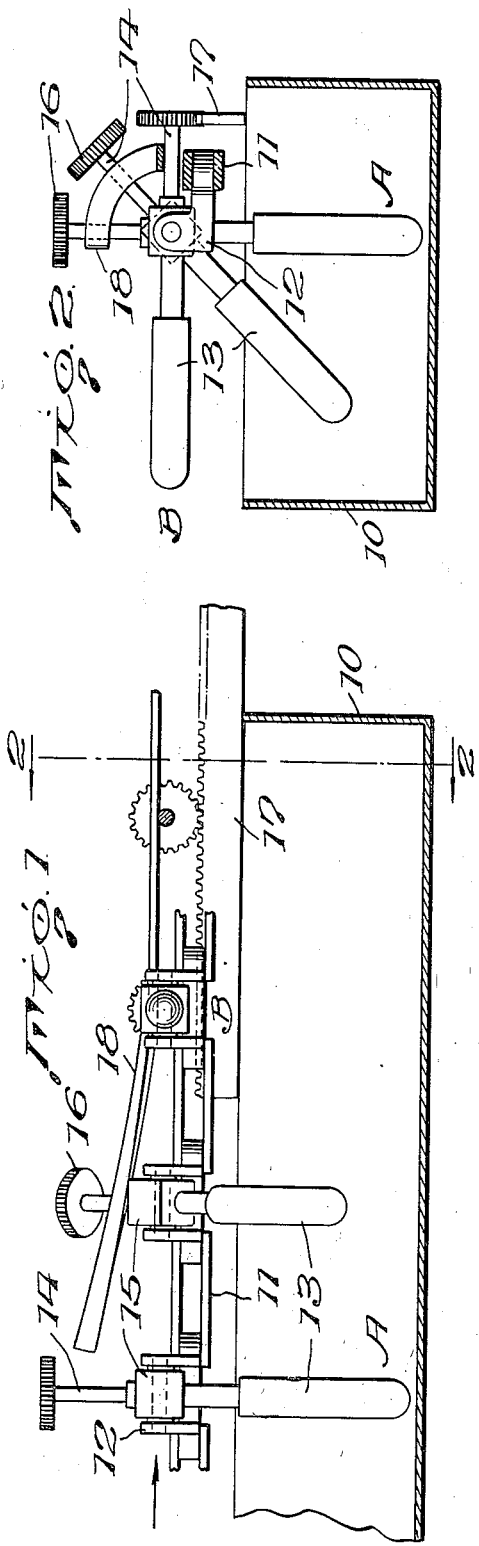
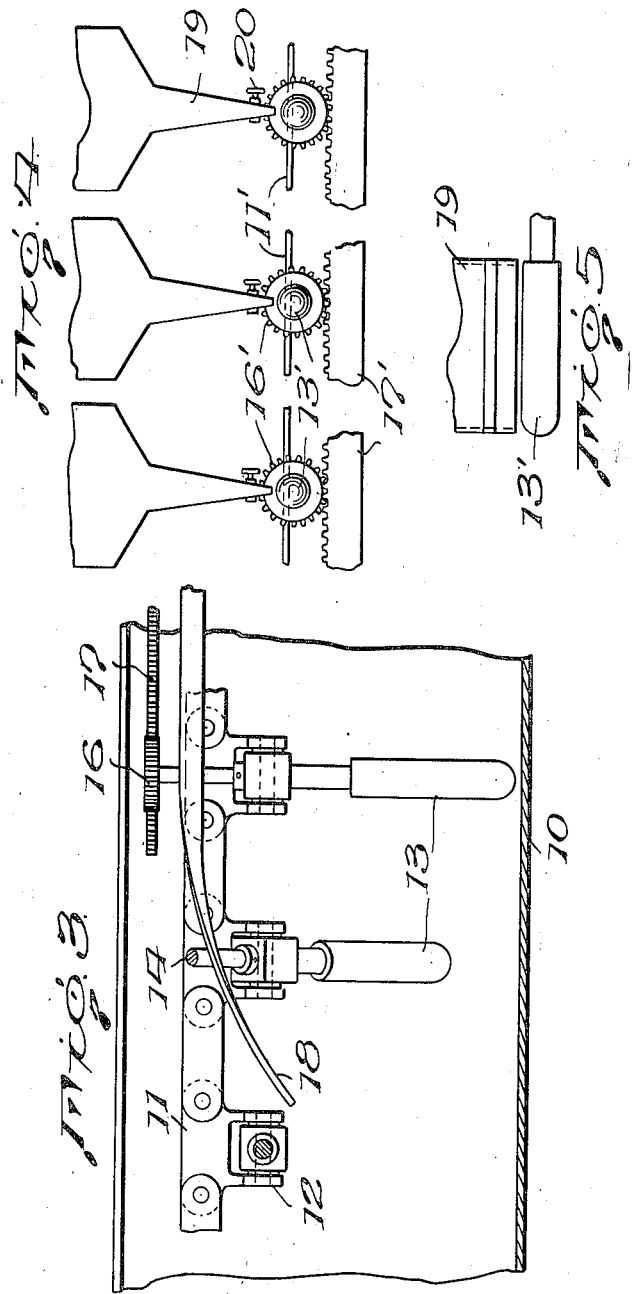
Inventor
Jakob Dichter,
By Charles B. Belknap
Attorney Patented Sept. 29, 1942

2,297,459

UNITED STATES PATENT OFFICE 2,297,459

APPARATUS FOR PRODUCING ARTICLES FROM ARTIFICIAL MATERIALS

Jakob Dichter, Berlin-Schoneberg, Germany; vested in the Alien Property Custodian Application September 9, 1940, Serial No. 356,093
In Germany September 30, 1939

1 Claim. (Cl. 18—24)

This invention relates to the production of hollow bodies from plastic materials and more particularly to the shaping of the bodies on or in a mold to which the plastic material is applied in a fluid condition and permitted to dry on the mold to assume the shape thereof. The specific invention pertains to distribution of the fluid plastic material over the surface of the mold in such a way that a uniform wall thickness of the body after it has dried is obtained.

At the present time one method of producing bodies from certain synthetic plastics, such as Neocell, Igelit and Mipolan, consists of dipping a substantially cylindrical form in the material while it is viscous and then permitting the material to dry on the form. This method has the disadvantage, however, that the material tends to flow until it begins to harden. If the mold be disposed in a vertical position the wall at the lower end of the body will be thicker than that at the top while if the mold be positioned horizontally the wall will be thicker on one side of the body than at the other side. It is the purpose of the present invention to obviate the difficulties referred to by distributing the material over the surface of the form.

One of the objects of the invention is to coat a mold or form with a plastic material in a fluid or viscous condition and then rotate the form to effect even distribution of the material over the surface of the form while it is being dried, thus insuring uniform wall thickness of the body resulting from these steps.

Another object of the invention is to apply and evenly distribute a viscous plastic material on a plurality of forms in a continuous sequence of operations.

Other objects will be apparent from the following description of the invention taken with the accompanying drawing in which:

Fig. 1 is a fragmentary front elevation of one embodiment of apparatus for carrying out the invention;

Fig. 2 is a section taken on line 2—2 of Fig. 1;

Fig. 3 is a fragmentary top plan view of the apparatus;

Fig. 4 is a fragmentary front elevation of another form of the invention; and

Fig. 5 is a fragmentary side view of the apparatus shown in Fig. 4.

In the drawing a receptacle 10 is designed to contain a fluid or viscous plastic material intended when dry to become substantially solid. A movable conveyor 11 having trunnions 12 thereon carries a plurality of forms 13 at one end of arbors 14, these arbors being rotatably supported in bearings 15 swingably mounted in trunnions 12. Secured to the other ends of the arbors 14 are pinions 16 adapted to engage a rack 17 which, together with the container 10, is fixed. Also fixed with respect to the rack is a cam 18 adapted to tilt the arbors from a position in which their axes are vertical, as shown at A, to one in which the axes of the arbors and forms are horizontal, as indicated at B. At station A the molds are immersed in the material in container 10, the material adhering to the mold when the latter is removed from the container. When the arbors are in their horizontal position pinions 16 engage fixed rack 17 and are thereby rotated as the conveyor moves the pinions thereover. This rotation of the forms, which is relatively slow causes the materials to be evenly distributed over the entire surface of the forms and is continued while the material is drying, thus preventing unequal thickness of the walls of the body at different points thereon after the body has hardened.

In the form of the invention illustrated in Fig. 4 the material may be applied to the molds by flowing the material thereon while the forms 13' are in a horizontal position and simultaneously rotating the forms. The material is discharged from elongated nozzles 19 controlled by suitable valves 20 which may be opened and closed periodically. As in the embodiment shown in Fig. 1, the forms are carried by a conveyor 11' and are rotated by pinions 16' engaging stationary rack 17'. Rotation of the forms is continued during the drying step. A plurality of nozzles may be employed as shown either to apply successive coats of the same or different colors thereon.

The invention is susceptible of many modifications such, for instance, as the addition of heating and further shaping means. While a link chain conveyor has been illustrated it is intended that other types of conveyors be employed if found desirable. The invention is, therefore, not limited to the particular apparatus shown but is to be construed broadly in accordance with the appended claim.

Having described my invention what I claim as new and desire to secure by Letters Patent is:

Apparatus for producing hollow bodies from flowable plastic material comprising a conveyor having trunnions thereon, a plurality of rotatable arbors, a forming mold at one end of each arbor, a pinion secured to the other end of each arbor, said arbors being journaled in said trunnions between said molds and said pinions, a stationary rack adapted to mesh with said pinions when said arbors are horizontally disposed, and a cam track positioned to engage said arbors between the pinions and the trunnions to swing said arbors to said horizontal position.

JAKOB DICHTER.